United States Patent [19]

Reiter

[11] 4,036,354

[45] * July 19, 1977

[54] CONVEYOR BELT CLEANER

[75] Inventor: Robert C. Reiter, Aurora, Ill.

[73] Assignee: Material Control, Inc., Aurora, Ill.

[*] Notice: The portion of the term of this patent subsequent to Nov. 30, 1993, has been disclaimed.

[21] Appl. No.: 642,757

[22] Filed: Dec. 22, 1975

[51] Int. Cl.² .................................................. B65G 45/00
[52] U.S. Cl. ..................................................... 198/499
[58] Field of Search ........ 198/188, 229, 230, 635–637, 198/499; 15/93 R, 256.5, 256.51, 256.6, 144 B; 74/230

[56] References Cited

U.S. PATENT DOCUMENTS

| 1,793,246 | 2/1931 | Philips | 198/499 |
| 2,398,821 | 4/1946 | Davidson | 198/230 |
| 3,101,837 | 8/1963 | Martin | 198/230 |
| 3,674,131 | 7/1972 | Matson | 198/230 |
| 3,795,308 | 3/1974 | Oury | 198/230 |

FOREIGN PATENT DOCUMENTS

| 1,066,949 | 10/1959 | Germany | 198/230 |
| 70,506 | 6/1946 | Norway | 15/144 B |
| 222,246 | 8/1968 | Sweden | 198/230 |
| 800,616 | 8/1958 | United Kingdom | 198/230 |

Primary Examiner—Evon C. Blunk
Assistant Examiner—Joseph E. Valenza
Attorney, Agent, or Firm—Cullen, Settle, Sloman & Cantor

[57] ABSTRACT

A scraper blade assembly for a conveyor belt cleaner mounted on a conveyor belt system having an endless belt trained about a drum and a rigid support for mounting the belt cleaner. The scraper blade assembly includes a bracket assembly having a pair of parallelly opposed upright plates. A generally L-shaped wiper arm having an arcuate mid-portion is pivotally suspended between the legs. A wiper blade is mounted at one end of the arm and a tension spring is connected between the other end of the arm and the bracket to pivotally urge the arm into scraping contact with the belt. The assembly may also include a stop member at said other end of the arm for limiting the pivotal movement of the arm in one direction to protect the assembly as the blade wears.

14 Claims, 5 Drawing Figures

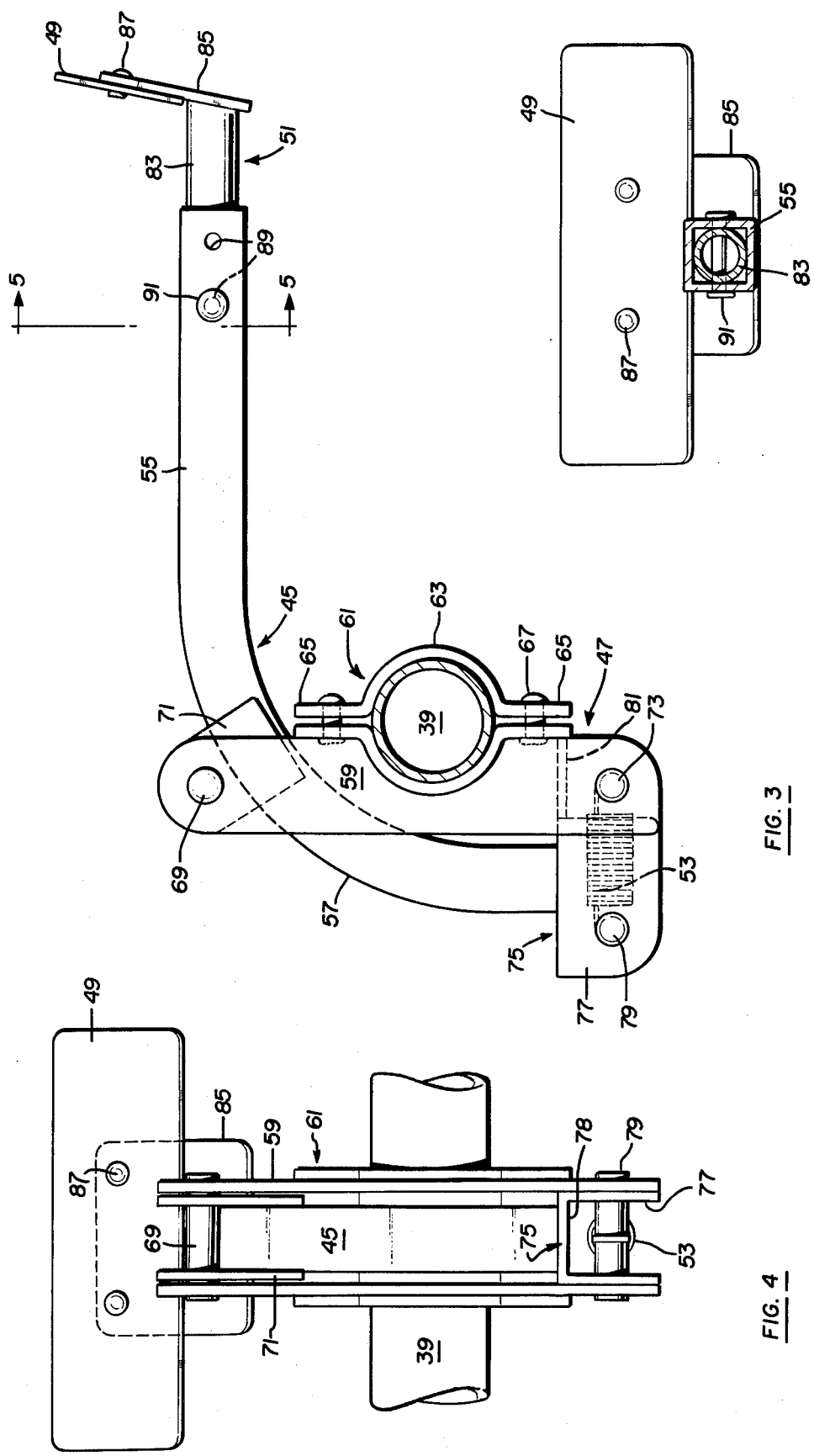

CONVEYOR BELT CLEANER

FIELD OF THE INVENTION

The invention relates generally to a conveyor belt cleaner and more particularly to a belt cleaner for scrapably wiping power driven conveyor belts.

DESCRIPTION OF THE PRIOR ART

The Prior Art discloses many types of mechanical cleaner assemblies mounted beneath the return run or strand of a conveyor belt for scraping or wiping foreign materials which have adhered to the belt. Early cleaners employed leaf springs to resiliently bias the wiper blades toward the conveyor belt and the blades were normally arranged in echelon fashion, in a single row, to provide an overlapping effect.

U.S. Pat. No. 3,342,312, which is assigned to the assignee of the present invention, issued to R. C. Reiter on Sept. 19, 1967 for a Mechanical Cleaner Assembly. The patent teaches a conveyor cleaner which employs a plurality of independently operable scraper blades which are biased toward the return run of the belt by a plurality of torsion spring arms. U.S. Pat. No. 3,656,610, which is assigned to the assignee of the present invention, issued to M. R. McWilliams on Apr. 18, 1972 for a Resiliently Mounted Conveyor Belt Cleaner in which a plurality of independently operable torsion spring wiper blade assemblies are mounted on a support structure by means of a resilient mounting which absorbs vibration and shock to minimize fatigue and breakage of the spring arms.

Other prior art patents have taught conveyor belt cleaner assemblies in which a plurality of scraper blades are arranged in at least two staggered rows in an overlapping fashion so as to achieve improved cleaning efficiency without interference between adjacent blades. Some teach individually operable scraper blade arms biased to swing about a pivot point and urge the wiper blade into scraping contact with the conveyor belt by means of individual elastomeric spring members associated with each of the arms.

Patent application Ser. No. 609,028, which was filed on Aug. 29, 1975 by R. C. Reiter and which is assigned to the assignee of the present invention, discloses a conveyor belt cleaner having a wiper blade assembly which employs a compression spring which is attached to the arm between the pivot point and the wiper blade. An adjustable stop is provided on the opposite side of the pivot point to limit the pivotal movement of the arm in one direction. Patent application Ser. No. 609,029 which was filed on Aug. 29, 1975 by R. C. Reiter and which is also assigned to the assignee of the present invention discloses a conveyor belt cleaner which employs an extension spring which is attached to the end of the arm on the opposite side of the pivot point from the end at which the wiper blade is attached. An adjustable stop is provided on the wiper blade side of the pivot point to limit the pivotal movement of the arm in one direction.

Each of the inventions referred to above represents a step forward in the art. Generally, it has been found that torsion springs have a long life in cleaning applications but they can not be made uniformly. Conversely, leaf springs can be made uniformly but do not have a long life in belt cleaning applications. Biasing schemes employing torsionally elastic torus members of an elastomeric material are often more costly to install and maintain and are relatively more complex than the more common types of springs. It has been found that the coil type tension or compression springs can be made with uniformity and appear to have a much longer life in belt cleaning applications than do elastomeric or leaf springs.

It has also been found that some leverage schemes can obtain a better mechanical advantage and a more efficient biasing arrangement than others. Schemes which connect only the back end of the wiper arm to a rigid support often allow the blade to move laterally or to twist since there is no lateral or longitudinal guidance for the arm. The patent applications cited above provide increased stability and guidance since the pivot pin passes laterally through the wiper arm. While this represents a considerable improvement over the prior art, some degree of lateral movement or twisting could be possible since optimum positive lateral guidance is not provided.

Additionally, the staggered arrangement of wiper blades in alternate rows in an overlapping fashion appears to offer several advantages over the echelon arrangement of the prior art. The staggered arrangement makes it much easier to change blades and there is less chance of interference between adjacent blades. Manufacturing two different lengths of arms or arm extension collars to provide the staggered effect is a costly technique and destroys the interchangeability of the arms. Blade replacement requires that arms of both lengths are readily available and the entire arm must be replaced. Even the use of arm extension collars requires a considerable investment in time and labor and, of course, collars of two different lengths, but at least the wiper arms themselves can be made with uniformity.

It is a primary object of the present invention to provide a conveyor belt cleaner having independently operable wiper arms which overcomes the disadvantages of the prior art set forth thereinabove.

SUMMARY OF THE INVENTION

As described, the conveyor belt cleaner of this invention is particularly adapted to efficiently scrape foreign material from the surface of conveyor belts. Each individually operable wiper arm is tensioned to bias the wiper blade into scraping contact with the surface of the belt by relatively uniform tension springs having relatively long lives in belt cleaning applications. The invention provides a wiper arm which is pivotally supported between positive guide means which provide lateral guidance to give better blade alignment and to prevent canting. Additionally, the need for wiper arms of different lengths to achieve the staggered effect and the need for time consuming collar installation or replacement is eliminated so as to allow the use of wiper arms of a uniform length which are completely interchangeable and which can be readily adjusted to achieve the staggered effect with a minimum of time and labor.

In the preferred embodiment of the conveyor belt cleaner of this invention, a bracket assembly is rigidly connected to a support which is fixedly positioned transversely of and adjacent to the return run of a conveyor belt. The bracket assembly includes a pair of parallelly apposed upright plates and a generally L-shaped arm having arcuate portions pivotally supported between the upright plates. A scraper blade is mounted at one end of the arm and a tension spring is connected between the other end of the arm and the bracket assembly. The spring tensions said other end toward the bracket assembly to urge the generally L-shaped arm to pivot in one direction and urge the scraper blade into scraping contact with said one run of the conveyor belt. The pair of upright plates serve to pivotally support the arm between the plates and suspend it therebetween for pivotal rotation of the arm, thereby providing a positive lateral guide on both sides of the arm to prevent lateral movement and canting. This insures a better alignment of the blade with respect to its position on the belt and prevents many of the problems previously encountered in the prior art.

A stop member may also be provided between the other end of the arm and bracket for limiting the movement of the arm in one direction so as to prevent damage which may occur when the blade becomes worn and the tension spring continues to urge the arm to pivot.

Additionally, the present invention provides an arm extension means for achieving the staggered effect with a minimum of time and labor. The wiper arms may be made of a uniform length with one end of the arms being channeled. An arm extension member adapted to be telescopically received within the channel of the arm has the wiper blade mounted at the distal end thereof. The extension member can be telescoped to at least a selected one of two or more telescopic positions within the channel of the arm and locked at the selected position to achieve the preferred staggered effect in a relatively simple manner. All of the arms and all of the arm extension members can be of uniform length and would be totally interchangeable. There would be no need for collars of differing lengths.

Other advantages and meritorious features of the present invention will be more fully understood from the following description of the drawings and preferred embodiments, the appended claims and the drawings in which:

BRIEF DESCRIPTION OF THE DRAWINGS

FIG. 3 is a fragmentary top view of one scraper blade assembly mounted on a support;

FIG. 4 is a side elevational view, partly in section, of the scraper blade assembly illustrated in FIG. 3; and FIG. 5 is a front elevational view of the scraper blade assembly, partially in section, in the direction of view arrows 5—5 of FIG. 4.

DESCRIPTION OF THE PREFERRED EMBODIMENT

Figure 1:
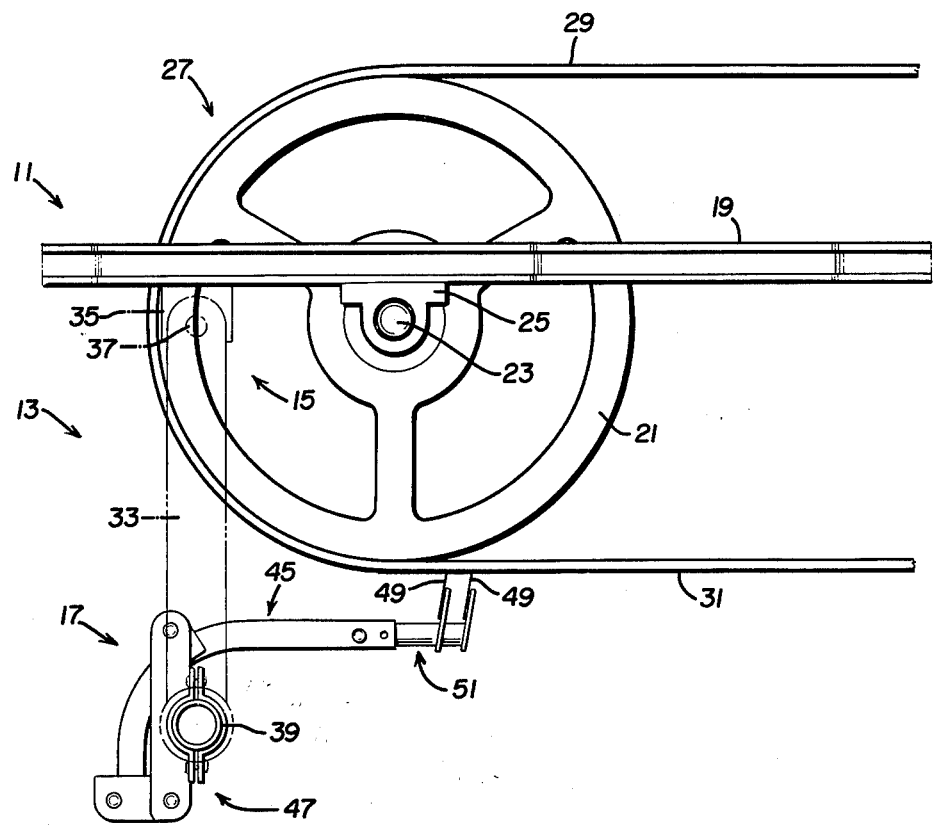
FIG. 1 is a fragmentary side view of a belt conveyor and the mechanical cleaner therefor, with the cleaner assembly being mounted beneath the return strand or run of the conveyor belt in an operative position.

FIG. 1 shows a conveyor belt assembly 11 having mounted thereon a mechanical belt cleaner assembly 13 which includes a hanger assembly 15 and a scraper blade assembly 17. The conveyor belt assembly 11 includes a frame 19 which supports a pair of pulleys, rollers or drums; only the head roller or drum being shown in the drawings and designated by the reference character 21. The drum 21 is mounted on a shaft 23 which is supported by lugs or bearings 25 carried by the frame 19. An endless belt 27 is entrained about the drum 21 so as to define an upper strand or delivery run 29 and a lower strand or return run 31. Such belts have been found useful in transporting various materials and it has been found that many of the materials transported adhere or stick to the belt. The life of the belt may be extended by removing abrasives or other foreign materials from the surface and the mechanical belt cleaner assembly 17 of the present invention operates to wipe or scrap the foreign materials from the surface of the belt 27 and thus prolonging its life.

The mechanical belt cleaner assembly 17 is suspended beneath the return strand 31 of the conveyor belt assembly 11 of FIG. 1 via a hanger assembly 13. The hanger assembly 13 includes a pair of hanger bars 33 each of which has its upper end connected to a hanger clip 35 by a pin connector 37 and the hanger clip 35 is securely attached to the frame 19 by bolts or some other similar fastening means, not shown. The hanger bars 33 are located at opposite sides of the frame 19 and hence the conveyor belt 27. The hanger bars 33 are arranged generally vertically as illustrated in FIG. 1 and their lower ends are adapted for receiving a support rod 39 which is securely positioned by the hanger bars 33 adjacent to and transversely of the lower strand 31 of the conveyor belt 27. Opposite ends of the support rod 39 are passed through openings in the lower end of the hangers 33, not shown but well known in the art, and the ends of the rod 39 are provided with sleeve portions 43 having levers or handles 41 thereon. The levers or handles 41 assist in the initial positioning of the scraper blade assemblies 17 for proper pressure and other adjustments as shown in the art.

Figure 2:
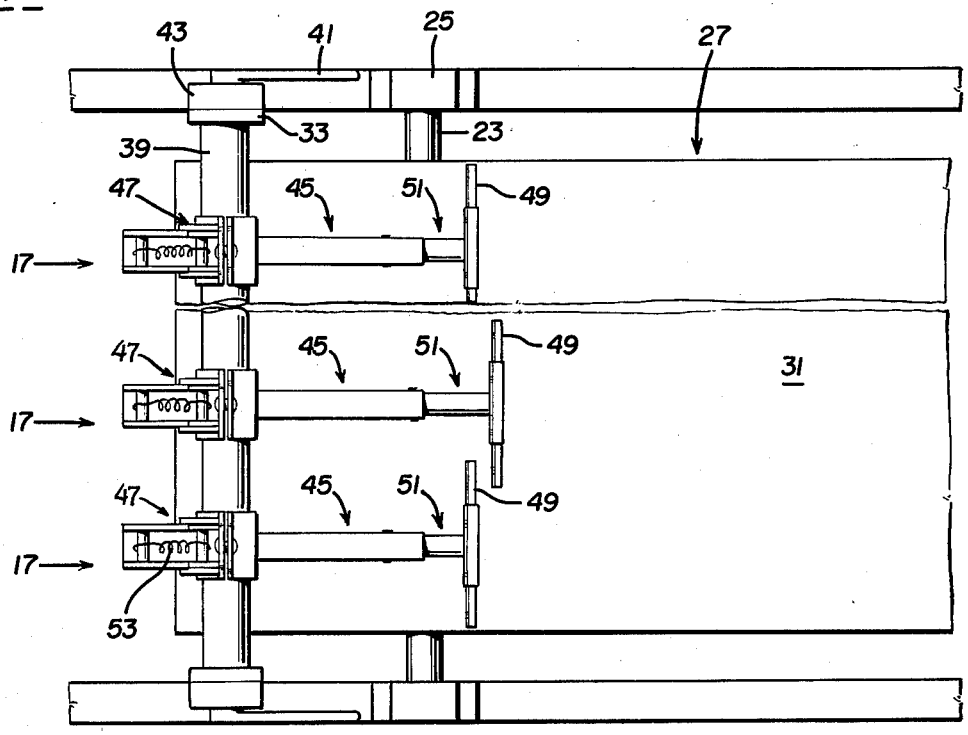
FIG. 2 is a fragmentary bottom view of the belt conveyor and cleaner assembly illustrated in FIG. 1.

As shown in FIG. 2, a plurality of scraper blade assemblies 17 are rigidly positioned in staggered rows transversely of the lower strand 31. Each of the scraper blade assemblies 17 will now be further described with reference to FIGS. 3, 4, and 5. Each scraper blade assembly 17 includes a generally L-shaped arm 45 which is pivotally mounted on a bracket assembly 47. A scraper blade or wiper blade 49 is attached to the distal end of the arm 45 by means of a blade mounting assembly 51. A tension spring 53 is connected to the opposite end of the arm 45 to tension the other end of the arm 45 toward the bracket assembly 47 so as to urge the arm 45 to rotatably pivot and bias the wiper blade 49 against the return run 31 of the belt 27 for scraping it clean.

As shown in FIG. 3, the arm 45 includes a relatively straight channel-defining arm portion 55 and a relatively arcuate arm portion 57. The bracket assembly 47 includes a pair of parallelly opposed upright legs or plates 59 which are rigidly connected to the support rod 39 via a clamp 61. The clamp 61 includes a pair of opposing clamp halves each of which includes a C-shaped center portion 63 and a pair of relatively straight extension plates 65 on either side of the C-shaped portion. The two C-shaped portions 63 are fitted about the support rod 39 and securely attached thereabout by means of a fastening means 67 which may, for example, be a bolt and threaded nut combination as known in the art. As the extension plates 65 are drawn together by the fastening means 67, the C-shaped portions 63 securely engage the support rod 39 and secure the pair of upright legs 59 securely to support 39 since the pair of upright legs is fixedly secured to one of the half sections of the clamp by means of welding or the like.

The upper end of the pair of upright legs or plates 59 have a pivot pin 69 mounted therebetween. A pair of parallelly opposed ear members 71 have one end rigidly attached to the arcuate arm portion 57 of the arm 45 and the other end adapted to receive the pivot pin 69 so that the arm is pivotally supported by the pin 69 and suspended between the upright legs 59 by the ear members 71. The upper end of the upright legs or plates 59 serve as lateral guides for the arm 55 insuring that the blade 49 is accurately aligned and positioned with respect to the lower run 31 of the belt 27. The positive guidance resulting from the upper ends of the upright plates 59 insure more accurate positioning and alignment of the arm 55 and prevent canting or twisting of the blade 49.

The lower end of the upright plates 59 support a spring anchor pin 73 therebetween and the distal end of the arcuate portion 57 of the arm 45 is equipped with an end abutment assembly 75. The end abuttment assembly 75 includes a pair of channel-defining walls 77 having a top portion 78 which is shown in FIG. 4. The top 78 and the walls 77 form an inverted U-shaped channel which extends from beyond the end of the arcuate portion 57 until just inside the lower end of the pair of upright legs 59. The walls 77 mount a spring attachment pin 79 and a coil tension spring 53 has one end anchored to the anchor pin 73 and the spring 53 is then tensioned and the other end is attached to the attachment pin 79. The spring 53 urges the end abutment assembly 75 and the distal end of the arcuate portion 57 toward the extension plate 65 of the clamp 61 causing the arm to pivot in the direction indicated by the arrow such that the wiper blade 49 is biased into scrapable engagement with the lower run 31.

The end abutment assembly 75 also includes a stop member 81 which is rigidly integral with the top member 78 and extends from the distal end of the arcuate portion 57 toward the lower end of the extension plate 65 of the clamp 61 in a confronting relationship thereto. The stop member 81 serves to limit the pivotal rotation of the arm 55 in the direction shown by the arrows by contacting the extension plate 65 of the clamp 61 to prevent rotation past a particular point. This serves to insure that the scraper blade assembly 16 will not be damaged when the wiper blade 49 has worn away and the arm 45 continues to bias the blade mounting assembly 51 into engagement with the belt 27.

The blade mounting assembly 51 will be described with reference to FIGS. 3 and 5. As shown in FIG. 5, the distal end of the relatively straight portion 55 of the arm 45 has a generally rectangular cross section and a channel therein. A generally cylindrical arm extension member 83 is telescopically received within the channel at the distal end of the straight portion 55 and has a flange member 85 rigidly connected to its distal end. The wiper blade 49 is securely attached to the flange 85 by a fastening means 87 which may be, for example, a bolt and nut assembly or some similar means as known in the art. The fastener 87 positions the wiper blade 49 in a generally upright position for engagement with the surface of the lower run 31 of the belt 27. The extension member 83 includes a single pin-receiving aperture through a diameter thereof and the distal end of the relatively straight portion 55 of the arm 45 includes a pair of apertures 89 through opposite channel-forming walls of the straight portion 55 at different distances from its distal end. The arm extension member 83 can be telescoped to align its aperture with either of the apertures 89 and a locking pin 91 can be inserted in a selected one of the pairs of apertures 89 to selectively lock the arm 45 at one of two different predetermined lengths. This enables a plurality of scraper blade assemblies 17 mounted on a common support rod 39 to be selectively adjusted to either of two lengths to achieve the staggered rows of wiper blades generally used in the art. Both the arms 45 and the arm extension members 83 can be of uniform length and the staggering effect is achieved simply by removing the pin 91 from one of the pair of apertures 89, telescoping the arm extension member 83 to the second position and inserting the locking pin 91 in the other pair of apertures 89. Hence, the staggered effect is achieved without using different size arms; without using different size collars and without extensive time and labor involved in inserting and removing the different collars.

With this detailed description of the specific apparatus used to illustrate the present invention and the operation thereof, it will be obvious to those skilled in the art that various modifications can be made without departing from the spirit and scope of the invention which is limited only by the appended claims.

What is claimed is:

1. A scraper blade assembly for a belt cleaner mounted on a conveyor system having a rotatable drum and an endless belt trained about said drum and providing delivery and return runs, said belt cleaner including a support fixedly located transversely of and adjacent to one of said runs and having a plurality of individual scraper blade assemblies operably disposed along said support, each of said scraper blade assemblies comprising: a generally L-shaped arm having an arcuate midportion; a bracket assembly rigidly connected to said support and including plate means for pivotally supporting said arm at said arcuate midportion so as to limit the lateral movement and canting of said arm, said plate means including a pair of parallely opposed upright plates; an individual and distinct scraper blade mounted on one end of each of said arms; tension spring means connected between the other end of said arm which is disposed on the opposite side of said pivotally supported midportion from said one end on which said scraper blade is mounted and said bracket assembly for tensioning said other end toward said bracket assembly to urge said arm to pivot in one direction and bias said scraper blade toward said one run; a stop means for limiting the movement of said arm in said one direction to prevent such damage as may occur when said blade becomes worn, said one end of said arm further includes a relatively straight portion and a blade mounting means telescopically received within said straight portion for enabling a staggered arrangement of scraper blades to be achieved with only uniform, completely substituteable arms whose lengths may be telescopically adjusted, said blade mounting member including a flange connected to the distal end of said blade mounting member and fastening means for securing said wiper blade to said flange.

2. The scraper blade assembly of claim 1, characterized in that said pair of upright plates include upper opposed portions and said bracket assembly includes a pivot pin mounted between said upper opposed portions for pivotally supporting said arm at said midportion.

3. The scraper blade assembly of claim 1 characterized in that said bracket means further includes a clamp for rigidly securing said pair of upright plates to said support, said clamp including a pair of opposed C-shaped clamp members adapted for receiving said support therebetween, each of said clamp members including relatively straight extensions on opposite sides of the C-shaped portion and fastening means for fastening each of the extensions of one of said pair of clamp members toward a corresponding opposed extension of the other of said pair of clamp members to enable the C-shaped portions to rigidly engage said support.

4. The scraper blade assembly of claim 1 characterized in that said pair of upright plates include lower opposed portions and said bracket assembly further includes a spring anchor member mounted between said lower portions for anchoring one end of said tension spring.

5. The scraper blade assembly of claim 2 characterized in that said arcuate portion of said arm includes a pair of outwardly extending parallelly opposed ear members having one end rigidly attached to said arcuate portion and the opposite end adapted to receive said pivot pin to pivotally support said arm between said pair of upright plates.

6. The scraper blade assembly of claim 4 characterized in that said arm includes a pair of channel-defining walls abuttedly secured to the other end of said arm and a spring attachment member mounted between said walls said tension spring having one end attached to said attachment member and the other end secured to said anchor member for tensioning the other end of said arm while the other end and the channel-defining walls protect said tension spring.

7. The scraper blade assembly of claim 3 further characterized in that said stop means includes a stop element secured to and moveable with said other end of said arm said stop element extending between said upright plates toward one of the relatively straight extensions of said clamp for contacting the same to limit the movement of the arm in said one direction.

8. The scraper blade assembly of claim 1 characterized in that said straight portion has a rectangular cross-section, said blade mounting member is substantially cylindrical and adapted to be telescopically received within said straight portion, said straight portion further includes fastening means for locking said blade mounting member within said straight portion at a selected one of at least two different telescoping positions.

9. The scraper blade assembly of claim 1 characterized in that said arm further includes means for selectively locking said blade mounting member within said straight portion at a selected one of at least two different telescopic positions.

10. In a conveyor belt scraper assembly having a scraping assembly support rigidly positioned adjacent to and transversely of one run of a conveyor belt which is to be scraped clean by a plurality of wiper blades positioned in at least two rows transverse of said belt, one of said rows being staggered with respect to the other of said rows and having said wiper blades arranged in an overlaying manner to increase cleaning efficiency without interference between adjacent blades, said conveyor belt scraper assembly having a plurality of blade assemblies each of which comprises a wiper blade, an arm member mounting said wiper blade at one end thereof, pivot means for pivotally mounting said arm, a bracket secured to said support for housing said pivot means and a spring urging said arm to pivot about said pivot means to bias said wiper blade into scraping engagement with said conveyor belt, an improved wiper blade mounting assembly comprising an elongated arm extension member, a channel-defining means at the end of said arm member adapted to telescopically receive said arm extension member, means for securely fastening said wiper blade to the distal end of said arm extension member and locking means for locking said arm extension member at a selected one of at least two telescopic positions within said channel-defining means for facilitating the establishment of said at least two staggered rows of wiper substituteable blades.

11. In a conveyor belt cleaner assembly having a belt cleaner support positioned adjacent to and transversely of a conveyor belt surface which is to be cleaned by a plurality of individually operable wiper blades, an improved wiper blade assembly comprising: an elongated generally L-shaped wiper arm one end of which is adapted to have one of said wiper blades secured thereto; bracket means securely connected to said cleaner support and including a pair of opposingly spaced bracket legs and a pivot means mounted between the upper ends of said legs for pivotally supporting an intermediate portion of said wiper arm between said legs so as to provide lateral guidance for said arm, a tension spring means for tensioning the opposite end of said wiper arm toward said bracket means to urge said arm to pivotally rotate in a direction to bias said wiper blade into wiping engagement with said conveyor belt surface, said wiper arm includes a relatively straight channel-forming member comprising said one end, a relatively straight tubular member telescopically received within said channel-forming member, a flange rigidly attached to the distal end of said tubular member and adapted to fastenably secure said wiper blade, and a locking member adapted to lock said tubular member at a selected one of at least two different telescopic positions within said channel-forming member.

12. The improved wiper blade assembly of claim 11 characterized in that the intermediate portion of said elongated wiper arm includes a relatively arcuate portion and a pair of parallelly spaced opposing ear members having one end rigidly connected to said arcuate portion, said ear members having the opposite ends adapted to pivotally engage said pivot means and suspend said arm.

13. The improved wiper blade assembly of claim 11 characterized in that said wiper arm further includes a spring attachment member and means rigidly attached to the opposite end of said arm for mounting said spring attachment member and in that said bracket means further includes a spring anchor and means at the lower end of said legs for mounting said spring anchor, said tension spring means having one end attached to said attachment member and the opposite end connected to said spring anchor.

14. The improved wiper blade assembly of claim 13 further characterized in that said means for mounting said spring anchor and said means for mounting said attachment member form a three-sided channel about said tension spring for protecting same and said wiper arm further includes a stop member rigidly secured to said opposite end and positioned between the lower ends of said legs for limiting the pivotal motion of said wiper arm in said direction.

* * * * *